United States Patent
Minagawa et al.

(10) Patent No.: US 9,681,141 B2
(45) Date of Patent: Jun. 13, 2017

(54) ERROR DETECTION ON VARIABLE LENGTH CODE DECODER

(75) Inventors: Yusuke Minagawa, Kawasaki (JP); Satoru Yamauchi, SongnamSi (KR)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1522 days.

(21) Appl. No.: 13/022,804

(22) Filed: Feb. 8, 2011

(65) Prior Publication Data

US 2012/0201309 A1 Aug. 9, 2012

(51) Int. Cl.
*H04N 7/50* (2006.01)
*H04N 19/169* (2014.01)
*H04N 19/91* (2014.01)
*H04N 19/48* (2014.01)
*H04N 19/44* (2014.01)
*H04N 19/89* (2014.01)

(52) U.S. Cl.
CPC ......... *H04N 19/1887* (2014.11); *H04N 19/44* (2014.11); *H04N 19/48* (2014.11); *H04N 19/89* (2014.11); *H04N 19/91* (2014.11)

(58) Field of Classification Search
CPC ....... H04N 19/00339; H04N 19/00563; H04N 19/00933; H04N 19/00951; H04N 19/1887; H04N 19/44; H04N 19/48; H04N 19/89; H04N 19/91

USPC ................. 375/240, E7.24, 240.27
See application file for complete search history.

(56) References Cited

U.S. PATENT DOCUMENTS

| | | | | |
|---|---|---|---|---|
| 6,721,362 | B2 * | 4/2004 | Lin et al. .................. | 375/240.27 |
| 7,136,010 | B2 * | 11/2006 | Cirillo et al. ............... | 342/25 R |
| 2004/0101055 | A1 * | 5/2004 | Hourunranta ............ | 375/240.24 |
| 2008/0240576 | A1 * | 10/2008 | Lee .............................. | 382/210 |
| 2009/0213938 | A1 * | 8/2009 | Lee et al. .................. | 375/240.24 |

OTHER PUBLICATIONS

Yovanof and Liu, "Statistical Analysis of the DCT Coefficients and Their Quantization Error" IEEE 1997.*

* cited by examiner

*Primary Examiner* — William C Vaughn, Jr.
*Assistant Examiner* — Naod Belai
(74) *Attorney, Agent, or Firm* — Robert D. Marshall, Jr.; Charles A. Brill; Frank D. Cimino (57) ABSTRACT

Decoding of image data from a bit stream of encoded image data is performed. The image data was encoded in a selected domain by a transform function. A set of coefficients is extracted from the bit stream, wherein the set of coefficients represent a block of the image data. Each coefficient is compared to a theoretical model of a distribution of the coefficient data representative of the transform function. A decoding error is indicated when a coefficient does not lie within the theoretical model.

13 Claims, 6 Drawing Sheets

FIG. 4 is flow diagram of the decode process of FIG. 3;
FIGS. 5-7 show illustrative digital systems in accordance with one or more embodiments of the invention.

ERROR DETECTION ON VARIABLE LENGTH CODE DECODER

FIELD OF THE INVENTION

This invention generally relates to error detection during decoding of compressed bitstream data, and in particular decoding with a variable length code (VLC) table for still image data.

BACKGROUND OF THE INVENTION

The demand for digital imaging products continues to increase. Some examples of applications for digital imaging include video communication, security and surveillance, industrial automation, and entertainment (e.g., DV, HDTV, satellite TV, set-top boxes, Internet video streaming, video gaming devices, digital cameras, cellular telephones, video jukeboxes, high-end displays and personal video recorders). Further, imaging applications are becoming increasingly mobile as a result of higher computation power in handsets, advances in battery technology, and high-speed wireless connectivity.

Image compression, i.e., JPEG and MPEG coding, is an essential enabler for digital video products as it enables the storage and transmission of digital video. JPEG is a commonly used method of lossy compression of image data for digital photography. During encoding, the image data is divided into 8×8 blocks which are then each compressed. The degree of compression can be adjusted, allowing a selectable tradeoff between storage size and image quality. JPEG typically achieves 10:1 compression with little perceptible loss in image quality.

JPEG compression is used in a number of image file formats. JPEG/Exif is the most common image format used by digital cameras and other photographic image capture devices; along with JPEG/JFIF, it is the most common format for storing and transmitting photographic images on the World Wide Web. These format variations are often not distinguished, and are simply called JPEG.

The term "JPEG" is an acronym for the Joint Photographic Experts Group which created the standard.

In general, video compression techniques apply prediction, transformation, quantization, and entropy coding to sequential blocks of pixels, i.e., coding blocks, in a video sequence to compress, i.e., encode, the video sequence. A coding block is a subset of a frame or a portion of a frame, e.g., a slice or a block of 64×64 pixels, in a video sequence and a coding block and a frame may be inter-coded or intra-coded. For encoding, a coding block may be divided into prediction blocks, e.g., 4×4, or 8×8 or 16×16 blocks of pixels. Prediction blocks may be inter-coded or intra-coded as well. In an intra-coded coding block, all prediction blocks are intra-coded. In an inter-coded coding block, the prediction blocks may be either intra-coded or inter-coded.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

A method for error detection while decoding variable length code (VLC) in a compressed bitstream of image data will now be described. Because image data is usually compressed in a frequency domain to which the original image data is transformed by DCT (discrete cosine transform), the transformed data has a spectrum in each transform unit. This means that all compressed image data is expected to be under the spectrum curve of the transform. The method in this disclosure adapts the spectrum table to error detection in a VLC decoder. This method enables the decoder to detect a code error from not only a VLC table that is used for decoding but also from data characteristics dependent on co-relationship of neighbored pixel data.

In decoding JPEG image data, an image check is typically performed after all of decoding is finished. Typically a VLC decoder (VLD) can detect an error in an input bitstream only by checking whether the VLC table has an entry which is equal to each code word of the bitstream and cannot check co-relationship of neighbored pixels for the decoded coefficient. Because of this, the decoding processor needs to check all pixels in order to check whether the decoded image has an error or not. This pixel by pixel checking consumes power and resources of a host processor, and may result in a long latency from a moment when error coefficient is decoded until when the error is detected and reported.

As will be described in more detail below, the decoded coefficient has a value that should be under the spectrum curve of the discrete cosine transform. Embodiments of the invention may provide an additional logic function with which the VLD core can check whether the decoded coefficient is under spectrum curve or not. If the decoded coefficient is out of the spectrum curve, the VLD reports a position of the coefficient to the host processor as a possible error. However, the VLD does not stop decoding unless a code word from the source bitstream is not matched to an entry of the VLC table.

Thus, embodiments of the invention may perform error detection using not only the VLC table but also distribution of decoded data. For example, in a JPEG decoder the decoder core may detect errors of a code word in a bitstream from not only the VLC table but also by using a spectrum curve of the decoded coefficient. In some cases, the code word in the bitstream is legal although the decoded coefficient has an error.

Embodiments of the invention allow errors to be detected during VLC decoding, which may result in a reduction of processor load and time to detect an error for decoded image data. This method enables the decoder core to report a location of a data error which may enable the processor to use this information when it checks on the error in the decoded image.

Figure 1:
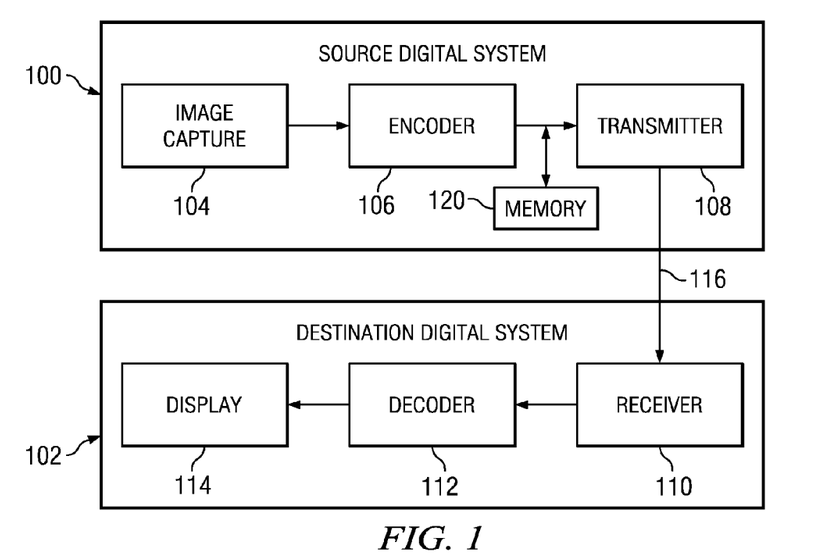
FIG. 1 shows a block diagram of a digital system in accordance with one or more embodiments of the invention.

FIG. 1 shows a block diagram of a digital system in accordance with one or more embodiments of the invention. The system includes a source digital system (100) that transmits encoded image data to a destination digital system (102) via a communication channel (116). The source digital system (100) includes an image capture component (104), an encoder component (106) and a transmitter component (108). The image capture component (104) is configured to provide image data to be encoded by the encoder component (106). The image capture component (104) may be for example, a camera, an image archive, or an image feed from a content provider. In some embodiments of the invention, the image capture component (104) may generate computer graphics as the image, or a combination of a live image and computer-generated images.

The image encoder component (106) receives image data from the image capture component (104) and encodes it for transmission by the transmitter component (108). For JPEG encoding, the image is split into blocks of 8×8 pixels, and for each block, each of the Y, $C_B$, and $C_R$ data components undergoes a discrete cosine transform (DCT). A DCT is similar to a Fourier transform in the sense that it produces a kind of spatial frequency spectrum.

The transmitter component (108) transmits the encoded image data to the destination digital system (102) via the communication channel (116). The communication channel (116) may be any communication medium, or combination of communication media suitable for transmission of the encoded video sequence, such as, for example, wired or wireless communication media, a local area network, or a wide area network.

Figure 3A:
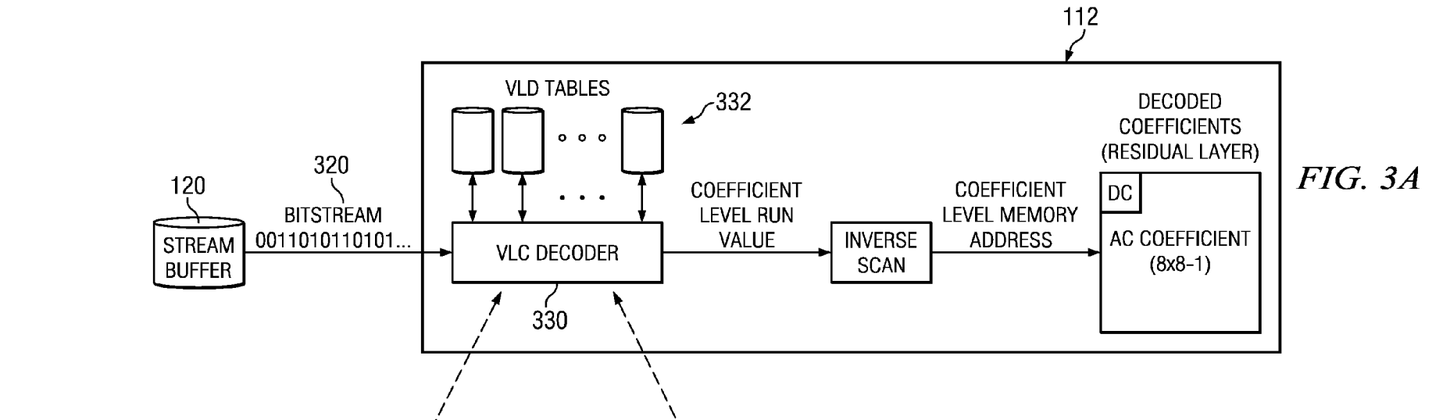
FIGS. 3A-3C illustrate a process diagram of an image decoder used in the system of FIG. 1.

The destination digital system (102) includes a receiver component (110), an image decoder component (112) and a display component (114). The receiver component (110) receives the encoded image data from the source digital system (100) via the communication channel (116) and provides the encoded image data to the image decoder component (112) for decoding. In general, the image decoder component (112) reverses the encoding process performed by the image encoder component (106) to reconstruct the coding blocks of the image. During the decoding process, a method for error detection in accordance with one or more of the embodiments described herein may be performed. The functionality of embodiments of the image decoder component (112) is described in more detail below in reference to FIG. 3.

The reconstructed image may then be displayed on the display component (114). The display component (114) may be any suitable display device such as, for example, a plasma display, a liquid crystal display (LCD), a light emitting diode (LED) display, etc.

In some embodiments of the invention, the source digital system (100) may also include a receiver component and an image decoder component and/or the destination digital system (102) may include a transmitter component and an image encoder component for transmission of image sequences both directions for image steaming, image broadcasting, and image telephony. The image encoder component (106) and the image decoder component (112) may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Data compression with VLC is applied to image data compression, and the image data compression is applied to many devices on digital consumer electronics market such as digital still camera or DVD/HDD recorder system. In this disclosure, an embodiment of a digital still camera will be explained in detail. However, the technique may also be applied to each frame of a video compression/decompression. In a video system, the video encoder component (106) and the video decoder component (112) may perform encoding and decoding in accordance with one or more video compression standards such as, for example, the Moving Picture Experts Group (MPEG) video compression standards, e.g., MPEG-1, MPEG-2, and MPEG-4, the ITU-T video compressions standards, e.g., H.263 and H.264, the Society of Motion Picture and Television Engineers (SMPTE) 421 M video CODEC standard (commonly referred to as "VC-1"), the video compression standard defined by the Audio Video Coding Standard Workgroup of China (commonly referred to as "AVS"), ITU-T/ISO High Efficiency Video Coding (HEVC) standard, etc.

For purposes of the description below, digital system 100 is assumed to be a digital camera. Image capture unit 104 captures a digital image of a scene via a lens. Encoded images are stored in memory 120 which may provide several gigabytes of storage for hundreds or thousands of pictures that are stored in the encoded, compressed format. When a user wishes to view a stored picture, the compressed data stream representing the picture is transferred to decoder 112 and the decoded picture is displayed on viewing display 114.

Figure 2:
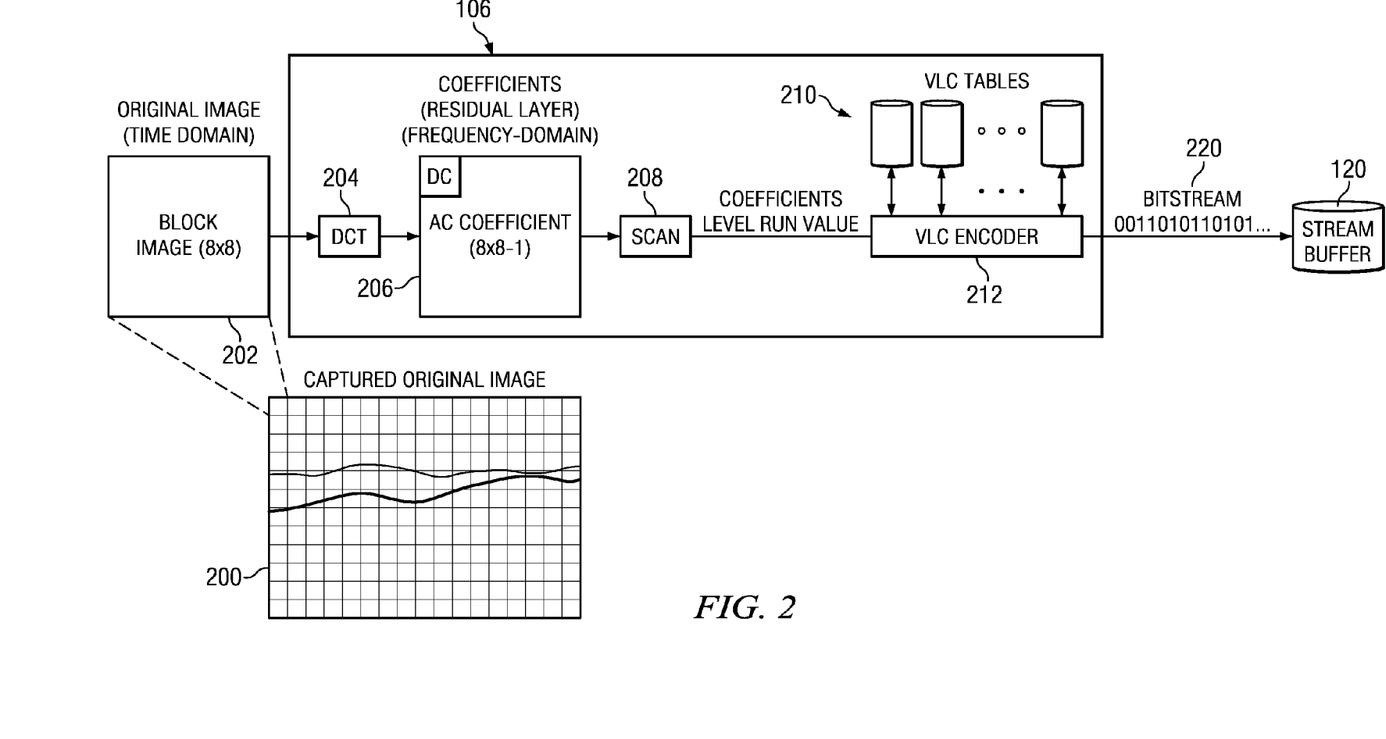
FIG. 2 is a process diagram of an image encoder used in the system of FIG. 1.

FIG. 2 is a process diagram of an image encoder 106 used in the system of FIG. 1. Digital still camera 100 applies JPEG compression to image data captured by image capture module 104. The camera captures a scene, for example scene 200, into image data 202 and compresses the captured image into a bitstream 220 with variable length code (VLC). For JPEG encoding, the representation of the colors in the image may be converted from RGB (red, green blue) to Y'CBCR, consisting of one luma component (Y'), representing brightness, and two chroma components, (CB and CR), representing color. However, in some systems this step is skipped. The resolution of the chroma data may be reduced, usually by a factor of 2. This reflects the fact that the eye is less sensitive to fine color details than to fine brightness details.

Image data 202 is split into blocks of 8×8 pixels, and for each block, each of the Y, CB, and CR data undergoes a discrete cosine transform (DCT) 204. A DCT is similar to a Fourier transform in the sense that it produces a kind of spatial frequency spectrum. The resulting data for all 8×8 blocks is further compressed with a lossless algorithm, a variant of Huffman encoding. The transformed data for each pixel is called "coefficient".

Each coefficient is quantized by quantization parameter 206. Human vision is much more sensitive to small variations in color or brightness over large areas than to the strength of high-frequency brightness variations. Therefore, the magnitudes of the high-frequency components are stored with a lower accuracy than the low-frequency components. The quality setting of the encoder (for example 50 or 95 on a scale of 0-100 in the Independent JPEG Group's library) affects to what extent the resolution of each frequency component is reduced. If an excessively low quality setting is used, the high-frequency components are discarded altogether.

Each quantized coefficient is referred to VLC table 210 by scanner 208 and a code word is generated by VLC encoder 212. The generated code word is integrated into bitstream 120.

FIG. 3A is a process diagram of an image decoder 112 used in digital camera 100 of FIG. 1. Decoding is executed essentially opposite to the way of the encoder.

VLC decoder (VLD) 330 checks for errors of code words in bitstream 320 which is read from stream buffer 120. If a code word in the bitstream is not matched to an entry in VLC table 332 or if a decoded pixel number of the block exceeds a unit size (in JPEG, 8×8=64[pixel]), VLD 330 regards the current code word as an error and calls a routine which can process the error. As long as a code word is matched to an entry of VLC table 332, VLD 330 continues decoding until the end of the image.

Figure 4:
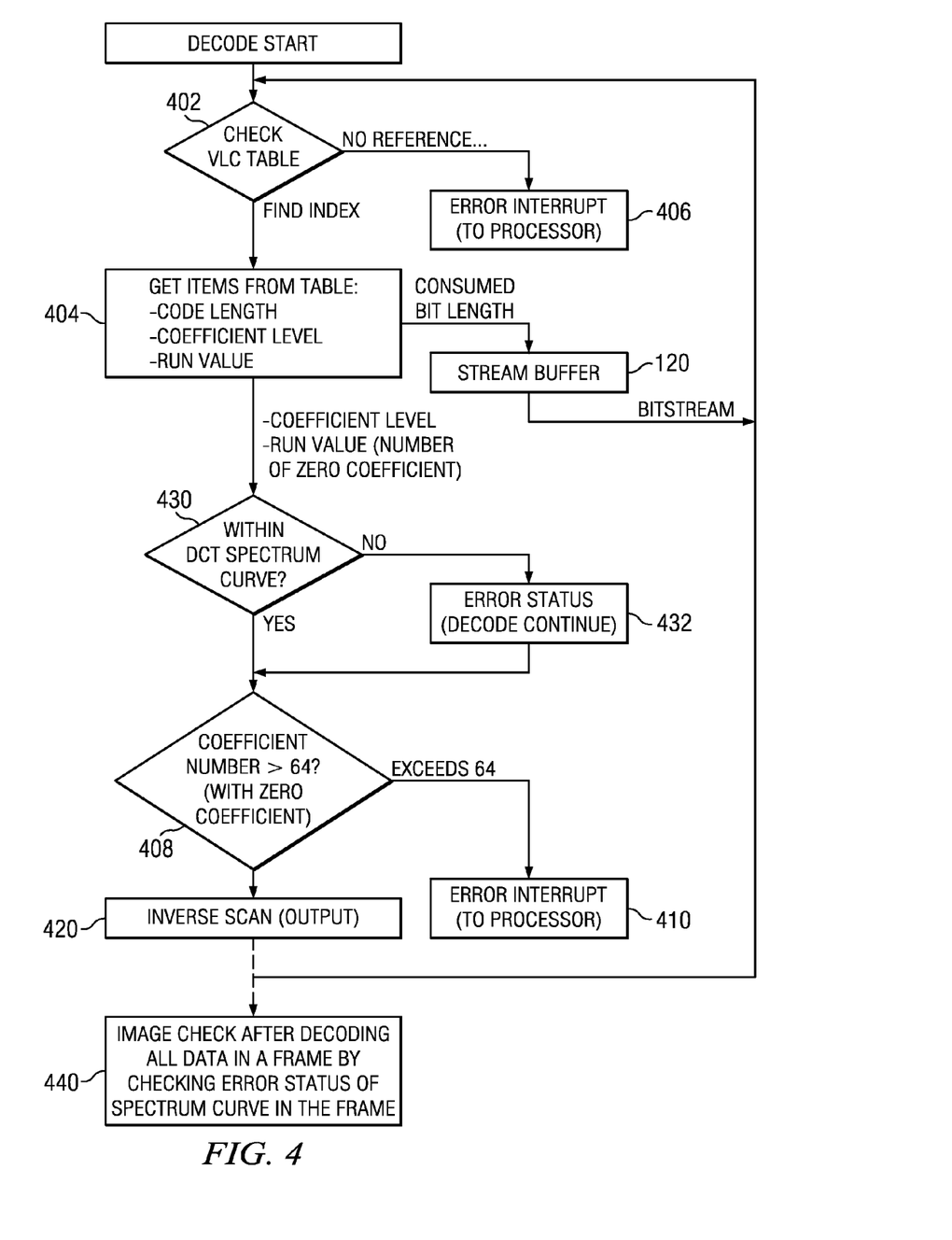
FIG. 4 is flow diagram of the decode process of FIG. 3.

FIG. 4 is flow diagram of the decode process of FIG. 3. As the bit stream is read from stream buffer 120, the VLD checks 402 the VLC table to verify each code word matches an entry in the VLC table. If a code word in the bitstream is not matched to an entry in the VLC table, then an error 406 is indicated. As long as each code word matches an entry in the VLC table, a set of parameters is retrieved 404 for the code word, including: code length, coefficient level, and run value which indicates a number of zero coefficients. If a decoded pixel number of the block exceeds 408 a unit size (in JPEG, 8×8=64[pixel]), the VLD regards the current code word as an error and calls 410 a routine which can process the error. As long as a code word is matched to an entry of VLC table 322, VLD 330 continues decoding until the end of the image.

If no further error checking is performed, it may be possible for the bitstream to have an error that is not detected because the erroneous code word is matched to an entry of the VLC table. In such a case, it may produce a load on the processor to detect the error later, if possible, and generate long latency after the error.

Embodiments of the invention include another check 430 that is done during the decoding process. Error detection logic 430 performs error detection in the VLD using a spectrum table of the decoded coefficients in a block. As discussed above, the decoded coefficient is in the frequency domain. Therefore, the decoded coefficients in a block have characteristics that should be under a spectrum curve of the DCT transform that originally produced them. The VLD includes a function 430 to check whether the decoded coefficient has a value outside of the spectrum curve or not. In this manner, the VLD can accomplish an error check not only using the VLC table, function 402, but also by examining 430 the co-relationship of neighbored pixels within the block.

Figure 3B:
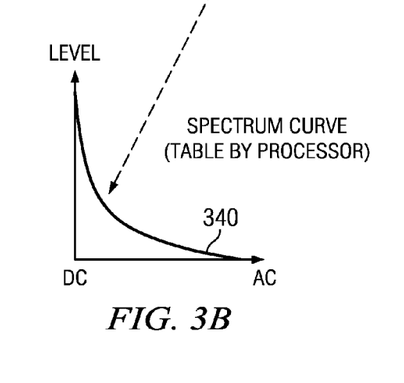
Figure 3C:
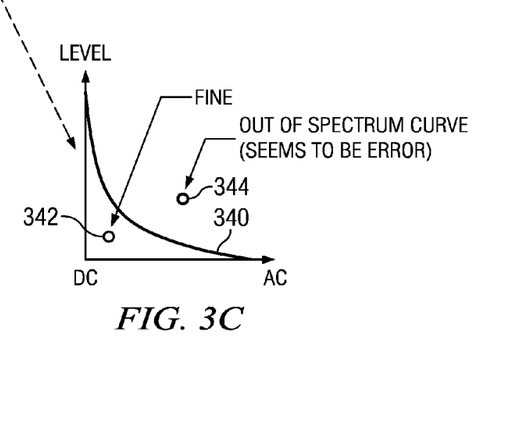

FIG. 3B is an illustration of a spectrum curve 340 that may be implemented as a spectrum table that is accessible by VLD 330. Spectrum curve 340 represents the DCT used to produce the compressed bit stream, such as that performed by DCT 204, referring back to FIG. 2. FIG. 3C illustrates examples of decoded coefficients in relationship to spectrum curve 340. For example, coefficient 342, after being extracted from bitstream 320 and compared 402 to the VLC coefficient table, is then compared 430 to spectrum curve 340. In this example coefficient 342 is under spectrum curve 340 and no error is indicated. For another example, coefficient 344, after being extracted from bitstream 320 and compared 402 to the VLC coefficient table, is then compared 430 to spectrum curve 340. In this example coefficient 344 is not under spectrum curve 340 and an error is indicated 432. Decoding may continue until the entire block is decoded. At that time, an image check is performed 440 after decoding all data in a frame by checking error status 432 of the spectrum curve in the frame.

In this embodiment, the VLD doesn't stop decoding even if the VLD finds a decoded coefficient which is outside of the spectrum curve of the DCT. Decoding is stopped only in case that no entry for a code word is in VLC table. In that case, the VLD stops decoding and interrupts 406 a host processor which may provide a higher level of decoding.

With this method, a co-relationship of neighbored pixel data can be checked by the VLD by using a spectrum curve related to the encoding DCT. Because a host processor can be aware of the place where the error pixel exists, it becomes much easier to accomplish checking image after decoding all pixels of a frame.

Figure 5:
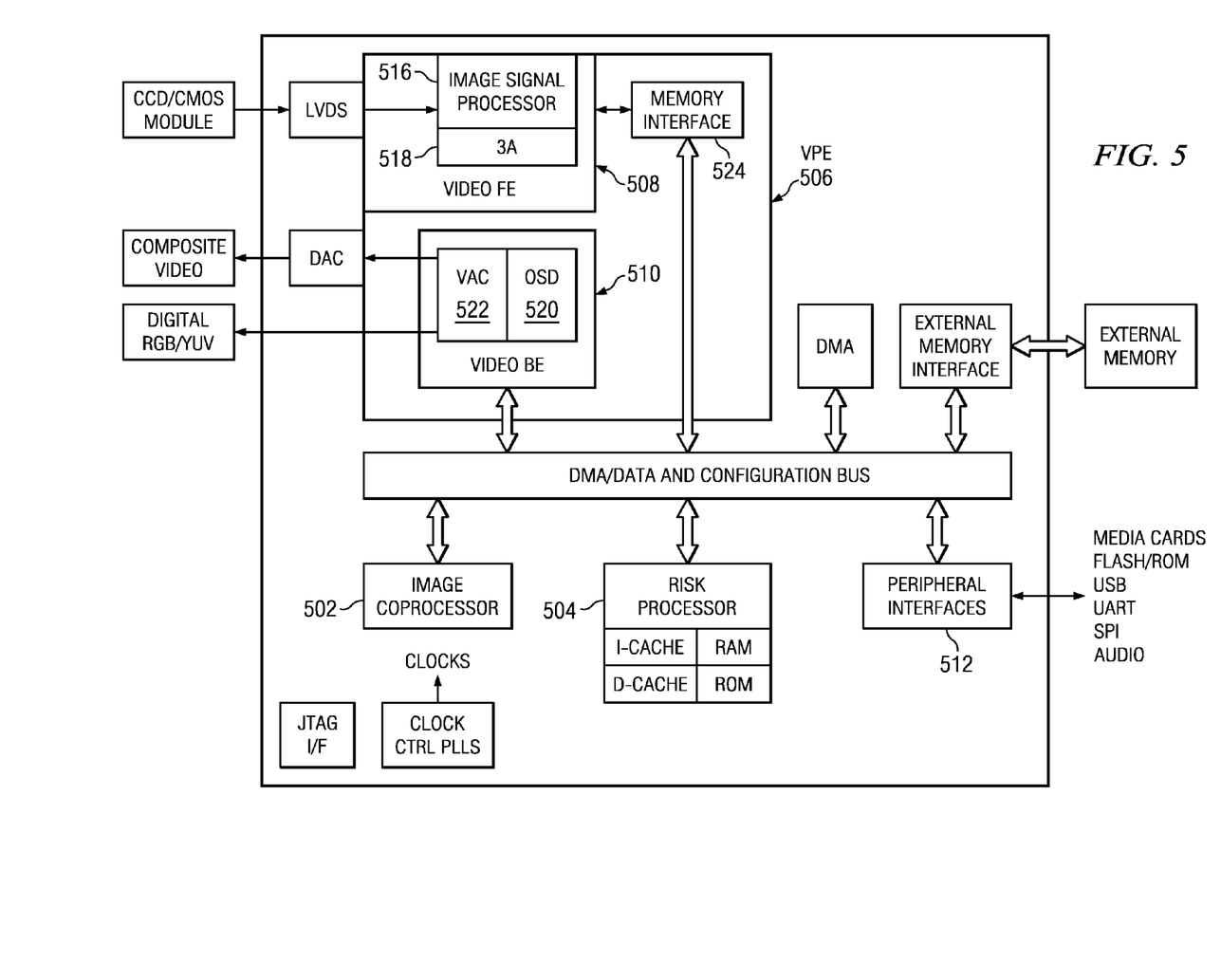
FIGS. 5-7 show illustrative digital systems in accordance with one or more embodiments of the invention.
Figure 6:
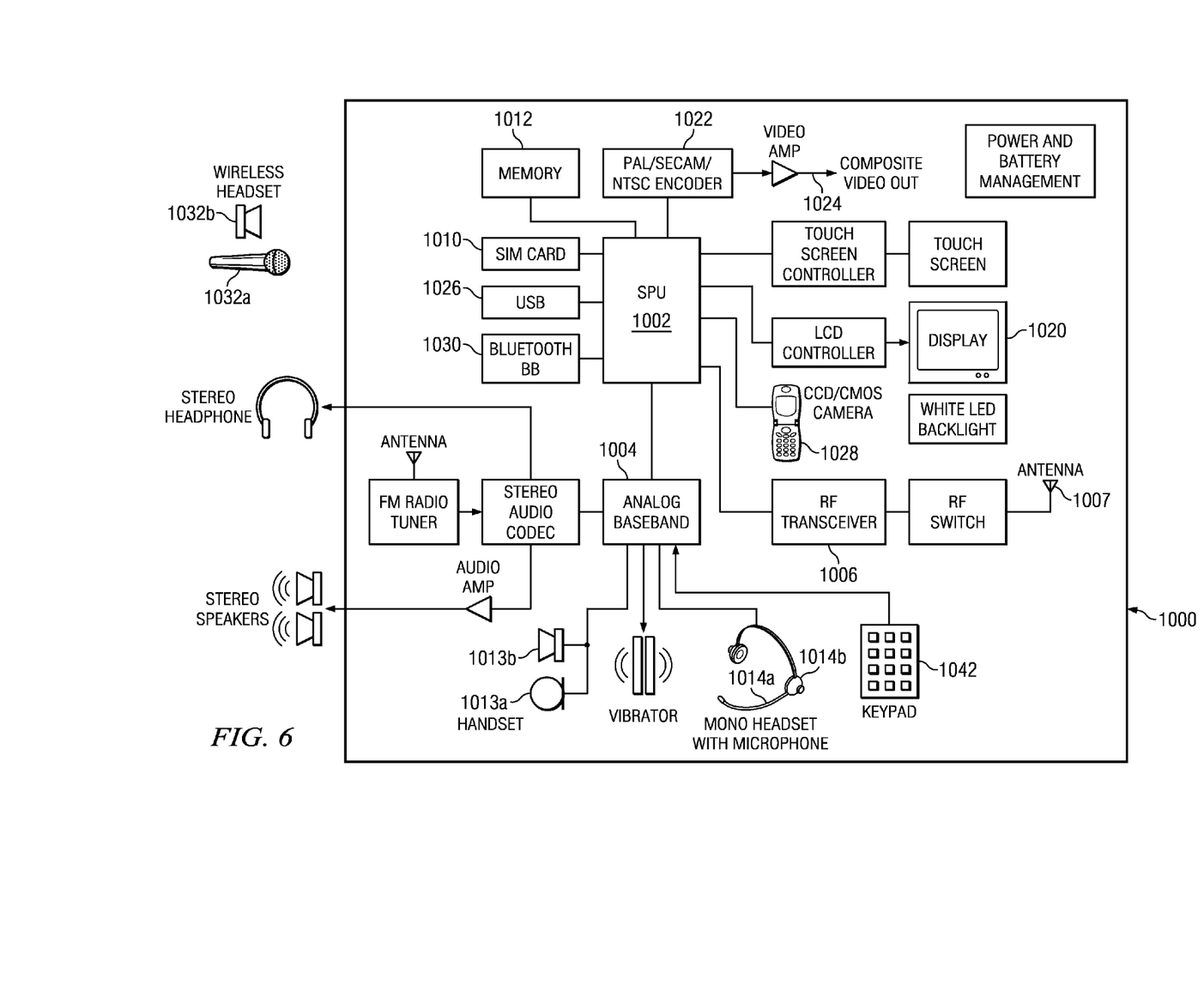
Figure 7:
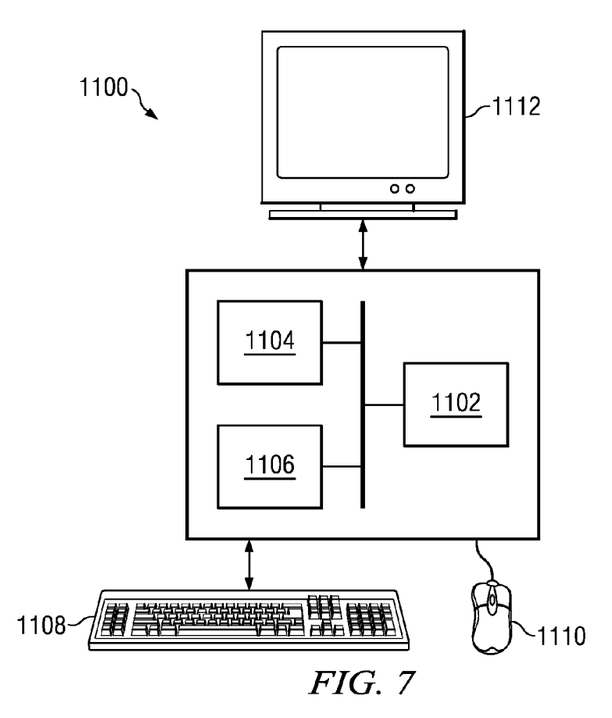

Embodiments of the methods and encoders as described herein may be implemented for virtually any type of digital system (e.g., a desk top computer, a laptop computer, a handheld device such as a mobile (i.e., cellular) phone, a personal digital assistant, a digital camera, etc.). FIGS. 5-7 show block diagrams of illustrative digital systems.

FIG. 5 shows a digital system suitable for an embedded system (e.g., a digital camera) in accordance with one or more embodiments of the invention that includes, among other components, a DSP-based image coprocessor (ICP) (502), a RISC processor (504), and a video processing engine (VPE) (506) that may be configured to perform methods as described herein. The RISC processor (504) may be any suitably configured RISC processor. The VPE (506) includes a configurable video processing front-end (Video FE) (508) input interface used for video capture from imaging peripherals such as image sensors, video decoders, etc., a configurable video processing back-end (Video BE) (510) output interface used for display devices such as SDTV displays, digital LCD panels, HDTV video encoders, etc, and memory interface (524) shared by the Video FE (508) and the Video BE (510). The digital system also includes peripheral interfaces (512) for various peripherals that may include a multi-media card, an audio serial port, a Universal Serial Bus (USB) controller, a serial port interface, etc.

The Video FE (508) includes an image signal processor (ISP) (516), and a 3A statistic generator (3A) (518). The ISP (516) provides an interface to image sensors and digital video sources. More specifically, the ISP (516) may accept raw image/video data from a sensor (CMOS or CCD) and can accept YUV video data in numerous formats. The ISP (516) also includes a parameterized image processing module with functionality to generate image data in a color format (e.g., RGB) from raw CCD/CMOS data. The ISP (516) is customizable for each sensor type and supports video frame rates for preview displays of captured digital images and for video recording modes. The ISP (516) also includes, among other functionality, an image resizer, statistics collection functionality, and a boundary signal calculator. The 3A module (518) includes functionality to support control loops for auto focus, auto white balance, and auto exposure by collecting metrics on the raw image data from the ISP (516) or external memory.

The Video BE (510) includes an on-screen display engine (OSD) (520) and a video analog encoder (VAC) (522). The OSD engine (520) includes functionality to manage display data in various formats for several different types of hardware display windows and it also handles gathering and blending of video data and display/bitmap data into a single display window before providing the data to the VAC (522) in YCbCr format. The VAC (522) includes functionality to take the display frame from the OSD engine (520) and format it into the desired output format and output signals required to interface to display devices. The VAC (522) may interface to composite NTSC/PAL video devices, S-Video devices, digital LCD devices, high-definition video encoders, DVI/HDMI devices, etc.

The memory interface (524) functions as the primary source and sink to modules in the Video FE (508) and the Video BE (510) that are requesting and/or transferring data to/from external memory. The memory interface (524) includes read and write buffers and arbitration logic.

The ICP (502) includes functionality to perform the computational operations required for video encoding and other processing of captured images. The video encoding standards supported may include one or more of the JPEG standards, the MPEG standards, and the H.26x standards. In one or more embodiments of the invention, the ICP (502) is configured to perform computational operations of methods for prediction mode dependent transform coding and decoding as described herein.

In operation, to capture a video sequence, video signals are received by the video FE (508) and converted to the input format needed to perform video encoding. The video data generated by the video FE (508) is stored in external memory. The video data is then encoded by a video encoder and stored in external memory and/or on a peripheral storage device via one of the peripheral interfaces (512). The encoded video data may then be read from the external memory or the peripheral storage device, decoded, and post-processed by the video BE (510) to display the video sequence. During the decoding, a co-relationship of neighbored pixel data can be checked by the decoder by using a spectrum curve related to an encoding DCT, as described herein.

FIG. 6 is a block diagram of a digital system (e.g., a mobile cellular telephone) (1000) that may be configured to examine a co-relationship of neighbored pixel data by an image decoder by using a spectrum curve related to an encoding DCT, as described herein. The signal processing unit (SPU) (1002) includes a digital signal processing system (DSP) that includes embedded memory and security features. The analog baseband unit (1004) receives a voice data stream from handset microphone (1013a) and sends a voice data stream to the handset mono speaker (1013b). The analog baseband unit (1004) also receives a voice data stream from the microphone (1014a) and sends a voice data stream to the mono headset (1014b). The analog baseband unit (1004) and the SPU (1002) may be separate ICs. In many embodiments, the analog baseband unit (1004) does not embed a programmable processor core, but performs processing based on configuration of audio paths, filters, gains, etc being setup by software running on the SPU (1002).

The display (1020) may also display pictures and video sequences received from a local camera (1028), or from other sources such as the USB (1026) or the memory (1012). The SPU (1002) may also send a picture or a video sequence to the display (1020) that is received from various sources such as the cellular network via the RF transceiver (1006) or the camera (1026). The SPU (1002) may also send a picture or a video sequence to an external video display unit via the encoder unit (1022) over a composite output terminal (1024). The encoder unit (1022) may provide encoding according to PAL/SECAM/NTSC video standards.

The SPU (1002) includes functionality to perform the computational operations required for image encoding and decoding. The video encoding standards supported may include, for example, one or more of the JPEG standards, the MPEG standards, and the H.26x standards. In one or more embodiments of the invention, the SPU (1002) is configured to examine a co-relationship of neighbored pixel data by using a spectrum curve related to an encoding DCT, as described herein. Software instructions implementing the transform coding and/or decoding may be stored in the memory (1012) and executed by the SPU (1002), for example, as part of encoding video sequences captured by the local camera (1028) and/or as part of decoding a received video sequence.

FIG. 7 shows a digital system (1100) (e.g., a personal computer) that includes a processor (1102), associated memory (1104), a storage device (1106), and numerous other elements and functionalities typical of digital systems (not shown). In one or more embodiments of the invention, a digital system may include multiple processors and/or one or more of the processors may be digital signal processors. The digital system (1100) may also include input means, such as a keyboard (1108) and a mouse (1110) (or other cursor control device), and output means, such as a monitor (1112) (or other display device). Those skilled in the art will appreciate that the input and output means may take other forms. The digital system (1100) may also include an image capture device (not shown) that includes circuitry (e.g., optics, a sensor, readout electronics) for capturing video sequences or still pictures. The digital system (1100) may include an embodiment of a video encoder for encoding the captured video sequences. The digital system (1100) may be connected to a network (1114) (e.g., a local area network (LAN), a wide area network (WAN) such as the Internet, a cellular network, any other similar type of network and/or any combination thereof) via a network interface connection (not shown). Encoded video sequences may be received by the digital system (1100) via the network and/or via a computer readable medium. The digital system (1100) may include an embodiment of an image decoder that may be configured to examine a co-relationship of neighbored pixel data by an image decoder by using a spectrum curve related to an encoding DCT, as described herein.

Further, those skilled in the art will appreciate that one or more elements of the aforementioned digital system (1100) may be located at a remote location and connected to the other elements over a network. Further, embodiments of the invention may be implemented on a distributed system having a plurality of nodes, where each portion of the system and software instructions may be located on a different node within the distributed system. In one embodiment of the invention, the node may be a digital system. Alternatively, the node may be a processor with associated physical memory. The node may alternatively be a processor with shared memory and/or resources.

Software instructions to perform embodiments of the invention may be stored on a computer readable medium such as a compact disc (CD), a diskette, a tape, a file, memory, or any other computer readable storage device. The software instructions may be distributed to the digital system (1100) via removable computer readable media (e.g., floppy disk, optical disk, flash memory, USB key), via a transmission path from computer readable media on another digital system, etc.

OTHER EMBODIMENTS

While the invention has been described with respect to a limited number of embodiments, those skilled in the art, having benefit of this disclosure, will appreciate that other embodiments can be devised which do not depart from the scope of the invention as disclosed herein. For example, a variety of image decoders that decode still images or video images that are compressed by conversion to the frequency domain may be configured to examine a co-relationship of neighbored pixel data by using a spectrum curve related to an encoding DCT, as described herein. These decoders may be found in cameras, cell phones, smart phones, personal digital assistants, etc. Accordingly, the scope of the invention should be limited only by the attached claims. It is therefore contemplated that the appended claims will cover any such modifications of the embodiments as fall within the true scope and spirit of the invention.

In the description herein, some terminology is used that is specifically defined in the JPEG coding standard and/or is well understood by those of ordinary skill in the art in image coding. Definitions of these terms are not provided in the interest of brevity. Further, this terminology is used for convenience of explanation and should not be considered as limiting embodiments of the invention to the JPEG standard. One of ordinary skill in the art will appreciate that different terminology may be used in other image encoding standards without departing from the described functionality.

Embodiments of the invention described herein referred to discrete cosine transforms for converting from the time domain to the frequency domain. Other embodiments may be configured to operate with other transforms, such as Laplace, Fourier, integer, wavelet, etc.

In another embodiment, rather than using a spectrum curve based on a DCT, another type of theoretical model of a distribution of the coefficient data may be used. For example, the distribution may be based on a time domain, a phase domain, or an amplitude domain, rather than a frequency domain.

Although the invention finds particular application to Digital Signal Processors (DSPs), implemented, for example, in an Application Specific Integrated Circuit (ASIC), it also finds application to other forms of processors. An ASIC may contain one or more megacells which each include custom designed functional circuits combined with pre-designed functional circuits provided by a design library.

Embodiments of the decoders and methods described herein may be provided on any of several types of digital systems: digital signal processors (DSPs), general purpose programmable processors, application specific circuits, or systems on a chip (SoC) such as combinations of a DSP and a reduced instruction set (RISC) processor together with various specialized accelerators. A stored program in an onboard or external (flash EEP) ROM or FRAM may be used to implement aspects of the video signal processing. Analog-to-digital converters and digital-to-analog converters provide coupling to the real world, modulators and demodulators (plus antennas for air interfaces) can provide coupling for waveform reception of image data being broadcast over the air by satellite, TV stations, cellular networks, etc or via wired networks such as the Internet.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A method for decoding image data, the method comprising:
   receiving a bit stream of encoded image data, wherein the image data was encoded in a selected domain by a transform function;
   extracting a set of coefficients from the bit stream, wherein the set of coefficients represent a block of the image data;
   comparing each coefficient to a theoretical model of a distribution of the coefficient data representative of the transform function; and
   indicating a decoding error when a coefficient does not lie within the theoretical model.

2. The method of claim 1, wherein the selected domain is a frequency domain.

3. The method of claim 2, wherein the theoretical model of a distribution is a spectrum curve.

4. The method of claim 2, wherein the transform is a discrete cosine transform.

5. The method of claim 1, further comprising:
   representing the set of coefficients by a code word table;
   determining if each one of the set of coefficients is contained within the code word table; and
   indicating an error when a coefficient is not represented in the code word table.

6. The method of claim 5, wherein the coefficients represent a variable length code (VLC), and wherein the code word table is a table of variable length codes.

7. An image system, comprising:
   a controller configured to manage at least a portion of the image system;

a decoder coupled to the controller, the decoder having an input for receiving a bitstream of encoded image data and an output for providing decoded image data, wherein the image data was encoded in a selected domain by a transform function, wherein the decoder is operable to:
- extract a set of coefficients from the bit stream, wherein the set of coefficients represent a block of the image data;
- compare each coefficient to a theoretical model of a distribution of the coefficient data representative of the transform function; and
- indicate a decoding error to the controller when a coefficient does not lie within the theoretical distribution model.

8. The image system of claim 7, further comprising a display module coupled to receive the decoded image data from the decoder.

9. The system of claim 7, wherein the selected domain is a frequency domain.

10. The system of claim 9, wherein the theoretical model of a distribution is a spectrum curve.

11. The system of claim 9, wherein the transform is a discrete cosine transform.

12. The system of claim 7, wherein the decoder is further operable to:
- represent the set of coefficients by a code word table;
- determine if each one of the set of coefficients is contained within the code word table; and
- indicate an error to the controller when a coefficient is not represented in the code word table.

13. The system of claim 12, wherein the coefficients represent a variable length code (VLC), and wherein the code word table is a table of variable length codes.

* * * * *